(12) United States Patent
Tachi et al.

(10) Patent No.: US 11,065,763 B2
(45) Date of Patent: Jul. 20, 2021

(54) CLAMP INSTALLATION APPARATUS, CLAMP INSTALLATION SYSTEM AND METHOD OF INSTALLING A CLAMP

(71) Applicant: MITSUBISHI HEAVY INDUSTRIES, LTD., Tokyo (JP)

(72) Inventors: Motoo Tachi, Tokyo (JP); Yukiharu Yamasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 344 days.

(21) Appl. No.: 16/325,087

(22) PCT Filed: Nov. 2, 2017

(86) PCT No.: PCT/JP2017/039779
§ 371 (c)(1),
(2) Date: Feb. 12, 2019

(87) PCT Pub. No.: WO2018/088331
PCT Pub. Date: May 17, 2018

(65) Prior Publication Data
US 2020/0198131 A1    Jun. 25, 2020

(30) Foreign Application Priority Data

Nov. 9, 2016 (JP) .............................. JP2016-219185

(51) Int. Cl.
| B25J 13/08 | (2006.01) |
| B25J 19/02 | (2006.01) |
| B25J 9/16 | (2006.01) |
| B64F 5/10 | (2017.01) |
| G05B 19/19 | (2006.01) |

(52) U.S. Cl.
CPC ........... B25J 9/1633 (2013.01); B25J 9/1615 (2013.01); B25J 13/089 (2013.01); B25J 19/022 (2013.01);
(Continued)

(58) Field of Classification Search
CPC . B25J 9/16; B25J 9/1612; B25J 9/1623; B25J 9/1628; B25J 9/1656; B25J 9/1633; B64F 5/10 (2017.01); G05B 19/19 (2013.01); G05B 2219/49129 (2013.01); G05B 2219/49132 (2013.01)

(56) References Cited

U.S. PATENT DOCUMENTS

| 10,279,483 B2 * | 5/2019 | Gosselin .................... B25J 9/16 |
| 2010/0038024 A1 | 2/2010 | Brandt |
| 2012/0011693 A1 | 1/2012 | Amirehteshami et al. |

FOREIGN PATENT DOCUMENTS

| EP | 2965876 A2 | 1/2016 | |
| JP | H0671581 A * | 11/1992 | ......... C04B 41/5025 |

(Continued)

OTHER PUBLICATIONS

PCT/ISA/210, "International Search Report for International Application No. PCT/JP2017/039779," dated Nov. 2, 2017.
(Continued)

Primary Examiner — Khoi H Tran
Assistant Examiner — Sarah A Tran
(74) Attorney, Agent, or Firm — Manabu Kanesaka; Benjamin Hauptman; Kenneth Berner

(57) ABSTRACT

A clamp installation apparatus includes a robot arm pedestal having a rotary table; a robot arm installed on the rotary table of the robot arm pedestal and having a plurality of arms and a plurality of joints; a robot hand installed to a forefront arm of the plurality of arms; and a control device. The robot hand includes: a clamp holding section configured to hold the clamp; a fastening section configured to fasten an engaging section of the clamp to give a clamp force to a work; and a measuring section configured to collect position data of a predetermined member of the clamp. The clamp can be automatically installed and removed. Also, the heat curing can be carried out in the condition to have installed the clamp.

10 Claims, 10 Drawing Sheets

(58) Field of Classification Search
CPC ........ B25J 9/1615; B25J 13/08; B25J 13/081;
B25J 13/082; B25J 13/085; B25J 13/086;
B25J 13/088; B25J 13/089; B25J 19/00;
B25J 19/02; B25J 19/021; B25J 19/022;
B64F 5/00; B64F 5/10; G05B 19/19;
G05B 19/195; G05B 2219/45071; G05B
2219/49129; G05B 2219/49132; G05B
2219/50127
See application file for complete search history.

(56) References Cited

FOREIGN PATENT DOCUMENTS

| | | |
|---|---|---|
| JP | H06-071581 A | 3/1994 |
| JP | 3428473 B2 | 7/2003 |
| JP | 2013-147222 A | 8/2013 |

OTHER PUBLICATIONS

Europe Patent Office, "Search Report for European Patent Application No. 17869312.3," dated Jun. 28, 2019.
PCT/IB/338, "Notification of Transmittal of Translation of the International Preliminary Report on Patentability for International Application No. PCT/JP2017/039779," dated May 23, 2019.
PCT/IB/373, "International Preliminary Report on Patentability for International Application No. PCT/JP2017/039779," dated May 14, 2019.
PCT/ISA/237, "Written Opinion of the International Searching Authority for International Application No. PCT/JP2017/039779," dated Dec. 19, 2017.

* cited by examiner

CLAMP INSTALLATION APPARATUS, CLAMP INSTALLATION SYSTEM AND METHOD OF INSTALLING A CLAMP

TECHNICAL FIELD

The present invention relates to a clamp installation apparatus, a clamp installation system and a method of installing a clamp.

BACKGROUND ART

In a manufacturing process of a slender product formed of CFRP (Carbon Fiber Reinforced Plastics), there is a process of heat-curing the product while pressurizing the product, to cure the product to a desired shape. An autoclave conformable to a high temperature and a high pressure is used for this heat curing. In case of a stringer used for the wing of an aircraft, the CFRP product has the length equal to or more than 10 m and is formed to have a complicated curved surface. Therefore, the CFRP product must be pressurized at more than one position during the heat curing. A method of fastening by the clamp is thought of, to pressurize this product.

The Patent Literature 1 discloses an apparatus which fixes a product by using the robot arm. The apparatus has a hole opened in the product and a locale pin engaging with the hole. In the apparatus, the locale pin is inserted into the hole to penetrate the product, and a clamp arm protrudes from a tip of the locale pin to fix the product.

In the apparatus in Patent Literature 1, it is necessary to open a hole in the product. In addition, it is difficult to heat-cure while maintained a fastened state.

CITATION LIST

Patent Literature

[Patent Literature 1] Japanese Patent No. 3428473

SUMMARY OF THE INVENTION

Considering the above situation, The present invention has, as an object, to provide a clamp installation apparatus, a clamp installation system and a method of installing a clamp. Other objects and effects will become clear from the following description.

To achieve the above object, the clamp installation apparatus according to a first embodiment of the present invention includes: a robot arm pedestal having a rotary table; a robot arm installed on the rotary table of the robot arm pedestal and having a plurality of arms and a plurality of joints; a robot hand installed to a forefront arm of the plurality of arms; and a control device. The robot hand includes: a clamp holding section configured to hold the clamp; a fastening section configured to fasten an engaging section of the clamp to give a clamp force to the work; and a measuring section configured to collect position data of a predetermined member of the clamp. The control device controls the clamp holding section to hold the clamp.

Also, the control device controls a rotary table, the plurality of joints of the robot arm and the robot hand so that the clamp is conveyed to a first predetermined position of the work pedestal on which the work has been placed in a condition that the clamp is held, and that an engaging section of the clamp be coupled to an engaging section of the work pedestal. Moreover, the control device controls the fastening section so that the clamp force is calculated based on the position data acquired from the measuring section in a condition that the clamp and the work pedestal are coupled to each other, and the calculated clamp force become a predetermined value.

The clamp includes: a frame; a screw section configured to screw with the frame and extend; an elastic section connected with the screw section and configured to give the clamp force to the work. At this time, the control device may control the fastening section to screw the screw section, so that the calculated clamp force becomes the predetermined value in a condition that the clamp and the work pedestal are coupled to each other.

The elastic section includes: a spring; a spring-section upper plate provided to one end of the spring to be connected with the screw section; and a spring-section lower plate provided to the other end of the spring. The spring-section lower plate may give an elastic clamp force to the work.

The measuring section may have a laser sensor section configured to measure the position data of the spring-section upper plate and the spring-section lower plate.

A head is formed in an upper end of the screw section. The fastening section may have a nut runner configured to drive the head.

The clamp holding section may have a parallel chuck which holds the clamp.

The work pedestal has a plurality of prominences. In this case, the clamp may have a plurality of hooks installed to the frame and engaged with the plurality of prominences, respectively.

A clamp installation system according to a second embodiment of the present invention includes the above-mentioned clamp installation apparatus; a first rail extending to a first direction as a longitudinal direction of the work; a second rail extending to a second direction orthogonal to the first direction. The robot arm pedestal includes: a first traveling mechanism configured to run on the first rail; and a second traveling mechanism configured to run on the second rail. The control device drives the first traveling mechanism and the second traveling mechanism so that the robot arm pedestal is moved to a predetermined position.

In a method of installing a clamp according to a third embodiment of the present invention, the robot hand is moved above the clamp as a first clamp, by driving the rotary table and the plurality of joints, in the clamp installation apparatus. Next, by lowering the robot hand, the first clamp is held by the clamp holding section. By lifting the first clamp in a condition that the first clamp is held, and the first clamp is conveyed to a first predetermined position of the work pedestal on which the work is put. By lowering the robot hand, the robot hand is moved in a horizontal plane so that a connection section of the first clamp is coupled to a connection section of the work pedestal. The clamp force is calculated based on the position data acquired from the measuring section in a condition that the first clamp and the work pedestal are coupled to each other. The fastening section is driven so that the calculated clamp force becomes a second predetermined value.

The above-mentioned method of installing a clamp in the above-mentioned clamp installation system includes: the clamp holding section may be controlled to release the first clamp when the installation of the first clamp is ended. Also, the second traveling mechanism is driven to move the robot arm pedestal to a position before taking-out of the first clamp. Also, the first traveling mechanism is driven to move the robot arm to a taking-out position of a second clamp.

According to the present invention, the clamp is automatically installed and removed. The heat curing can be carried out in the condition to have installed the clamp.

DESCRIPTION OF EMBODIMENTS (Structure of Clamp)

The structure of a clamp 50 according to the present invention will be described with reference to FIG. 5. In this case, it is supposed that a right direction on a sheet is a y direction, an upper direction on the sheet is a z direction, and a front direction orthogonal to the sheet is an x direction. Also, supposing that a +z direction is an upper direction and a −z direction is a lower direction, the description will be made. The x direction, the y direction and the z direction in each of the other drawings will be used based on the x direction, the y direction and the z direction in FIG. 5. Note that the lower direction shows the −z direction and does not indicate the gravity direction.

Figure 5:
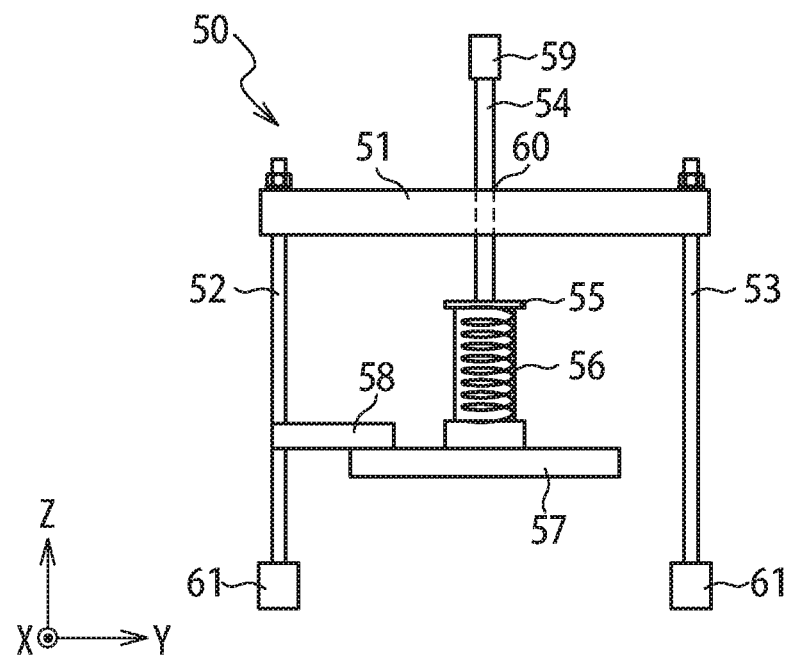
FIG. 5 is a front view of a clamp according to the present invention.

As shown in FIG. 5, the clamp 50 has a side plate section 51, a first arm section 52, a second arm section 53, a fastening screw 54, a spring-section upper plate 55, a spring 56, a spring-section lower plate 57 and a connection plate 58.

The side plate section 51 is formed as a flat plate extending to the y direction and has a screw hole 60 at its central position in the y direction.

The fastening screw 54 has threads and is provided to engage with the screw hole 60 of the side plate section 51. By rotating the fastening screw 54, the fastening screw 54 moves to an upper or lower direction (the z direction) with respect to the side plate section 51. Also, the fastening screw 54 has a hexagonal head 59 in its upper end.

The spring-section upper plate 55 is formed as a flat plate and its upper surface is connected with the lower end of the fastening screw 54. Therefore, by rotating the fastening screw 54, the spring-section upper plate 55 moves to the upper or lower direction relatively to the side plate section 51. Also, the spring-section upper plate 55 is provided to be rotatable in the x-y plane with respect to the fastening screw 54.

The upper end of the spring 56 is connected with the underside of the spring-section upper plate 55.

The spring-section lower plate 57 is formed as a flat plate and its upper surface is connected with the lower end of the spring 56.

Figure 6:
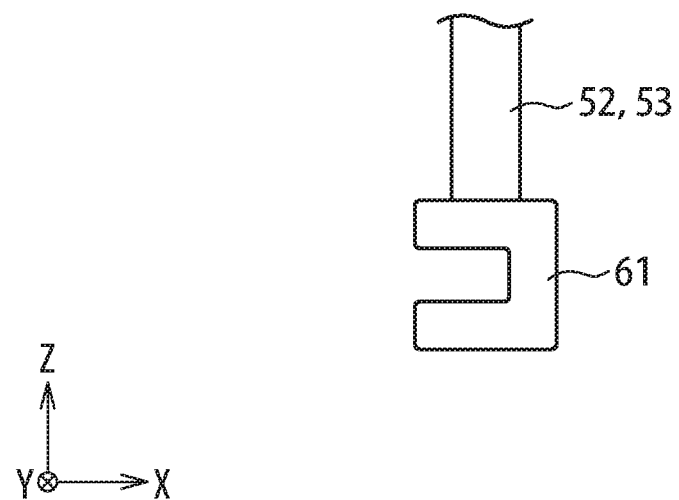
FIG. 6 is a left-side expanded view showing a lower end of a first arm section shown in FIG. 5.

An upper end of the first arm section 52 is connected with an end of the side plate section 51 in the −y direction. An upper end of the second arm section 53 is connected with an end of the side plate section 51 in the +y direction. As shown in FIG. 6, a hook 61 is formed at a lower end of each of the first arm section 52 and the second arm section 53. The clamp 50 can be supported by hooking this hook 61.

As shown in FIG. 5, the connection plate 58 is formed in a plate-like shape, and its end in the +y direction is connected with the spring-section lower plate 57. The first arm section 52 passes through the connection plate 58 at its end in the −y direction so that the connection plate 58 can slide up or down along the first arm section 52. Thus, when the fastening screw 54 is rotated, the connection plate 58 moves to the upper or lower direction according to the movement of the spring-section lower plate 57 to the upper or lower direction. Also, since the first arm section 52 passes through the end of the connection plate 58, the spring-section lower plate 57 does not rotate. In other words, even if the spring-section lower plate 57 is driven to rotate according to the rotation of the fastening screw 54 through the spring-section upper plate 55 and the spring 56, the rotation of the spring-section lower plate 57 is prevented by the connection plate 58.

(Method of Using Clamp)

Figure 7:
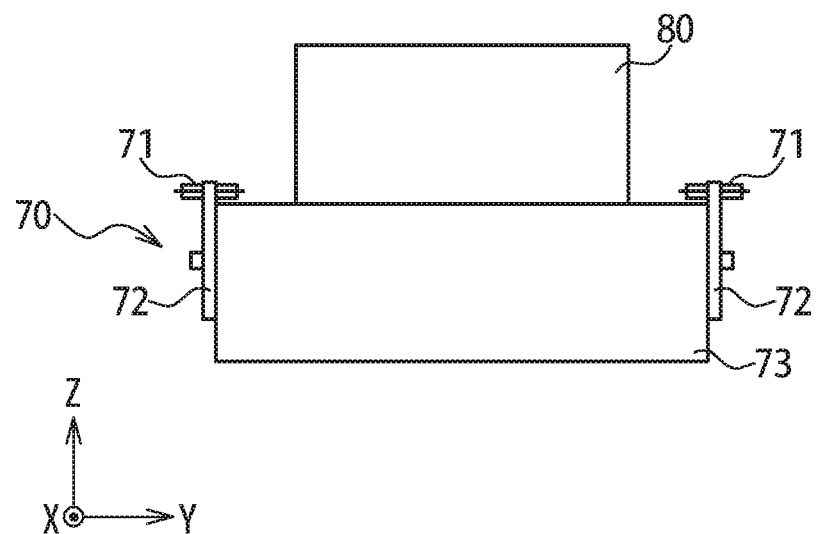
FIG. 7 is a diagram when a work to be installed with the clamp is placed on a work pedestal.

As shown in FIG. 7, the clamp 50 is used to apply a pressure to a work 80 placed on the work pedestal 70.

In this case, the work pedestal 70 has connection sections 71, pedestal side plates 72 and a pedestal 73.

The pedestal 73 has a structure on which the work 80 is placed. Therefore, the pedestal 73 is extended to the x direction according to the length of the work 80.

The pedestal side plates 72 are fixed on both sides of the pedestal 73. Like the pedestal 73, the pedestal side plate 72 is also extended to the x direction according to the length of the work 80. Also, the upper end of the pedestal side plate 72 is located above the pedestal 73.

The connection section 71 has a circular column shape, and is provided to pass through the pedestal side plate 72 at an upper end of the pedestal side plate 72. The connection section 71 is provided according to a position at which the clamp 50 is installed.

Figure 8:
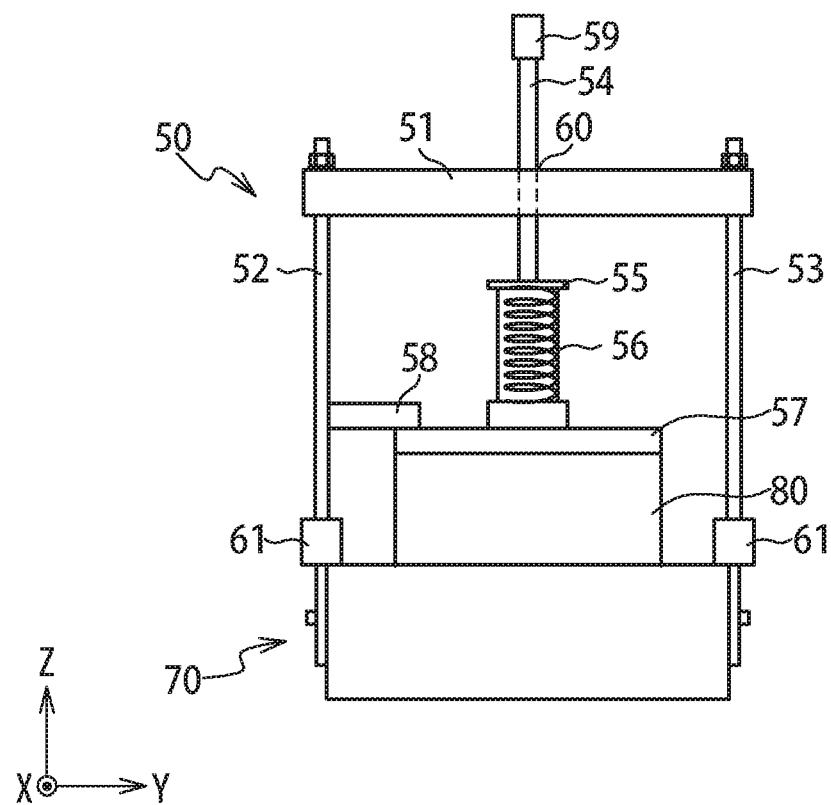
FIG. 8 is a diagram showing a state that the clamp is installed to the work.

As shown in FIG. 8, the clamp 50 is installed to the work 80 which is placed on the work pedestal 70.

Figure 9:
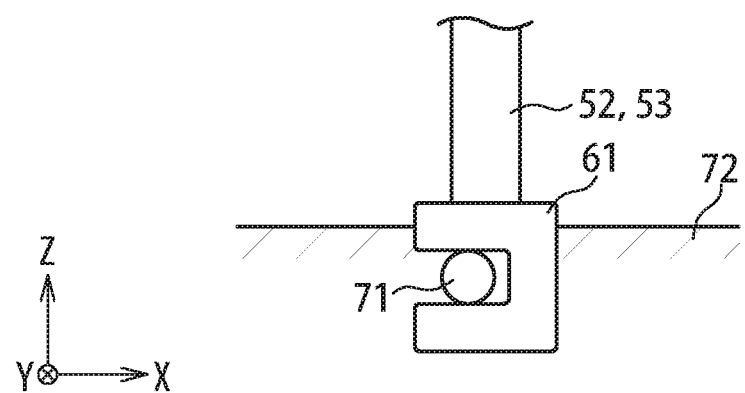
FIG. 9 is a left-side expanded view of the lower end of the first arm section when the clamp is installed to the work.

As shown in FIG. 9, to install the clamp 50 to the work 80, the hooks 61 provided at the lower ends of the first and second arm sections of the clamp 50 are first hooked to the connection section 71 of the work pedestal 70.

After that, the fastening screw 54 is rotated by applying a rotation force to a head 59. Thus, the spring-section upper plate 55, the spring 56, the spring-section lower plate 57 moves downwardly. When the spring-section lower plate 57 touches the work 80, the spring-section lower plate 57 is set to a state that it becomes not able to move downwardly. Therefore, when the fastening screw 54 is further rotated, the screwing section of the side plate section 51 and the fastening screw 54 are fastened up. As a result, the spring-section upper plate 55 moves downwardly so that the spring 56 shrinks. Therefore, the spring 56 presses the work 80 through the spring-section lower plate 57. In other words, the work 80 is sandwiched by the work pedestal 70 and the spring-section lower plate 57.

In this way, the clamp 50 is installed to the work 80 so that the work 80 is pressurized.

(Structure of Clamp Installation Apparatus)

The structure of the clamp installation apparatus 1 which is used for the installation and removal of the clamp 50 will be described with reference to FIG. 1.

Figure 1:
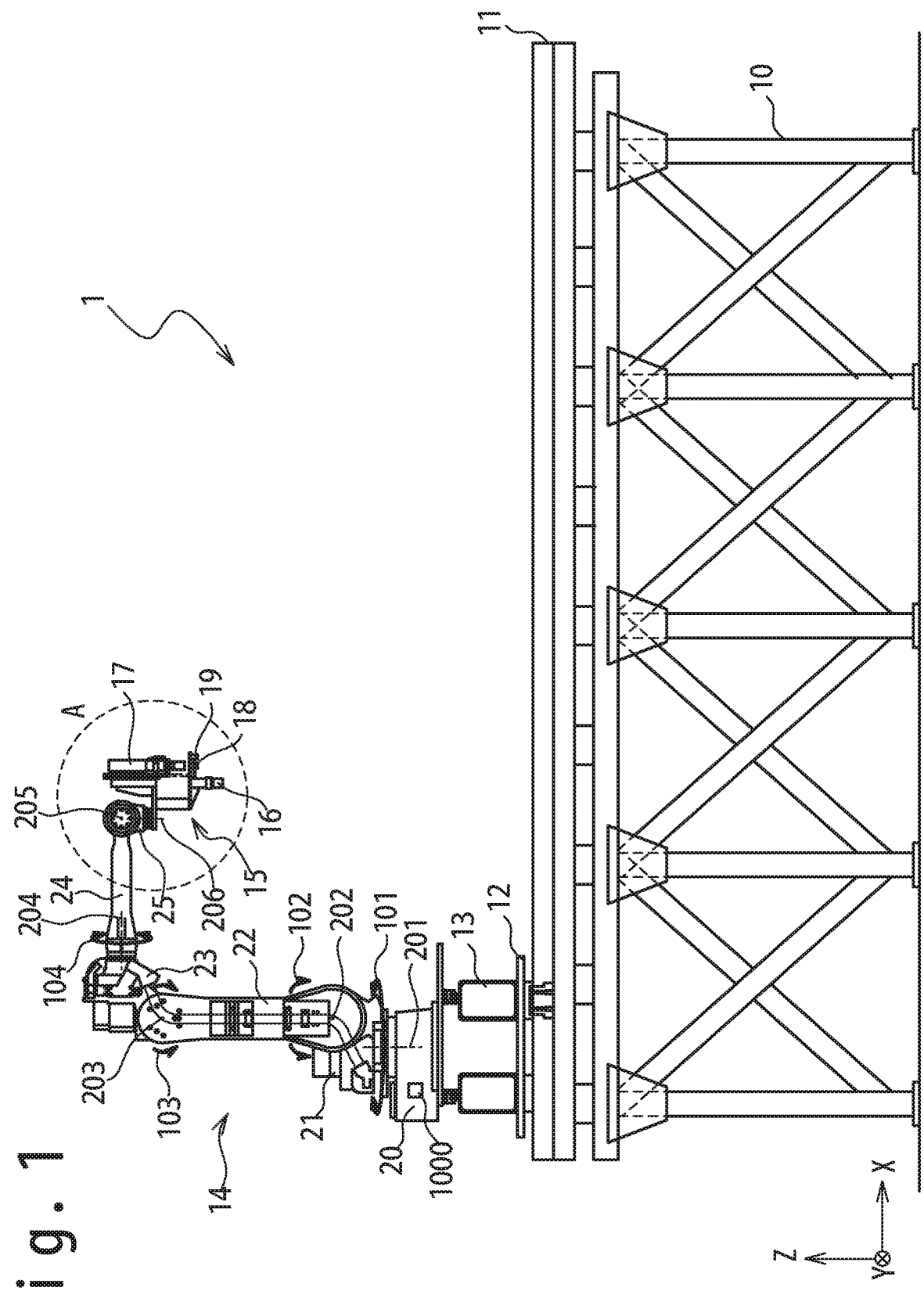
FIG. 1 is a front view showing a clamp installation apparatus according to the present invention.

As shown in FIG. 1, the clamp installation apparatus 1 has a support table 10, a first rail 11, a second rail support table 12, a second rail 13, a robot arm 14 and a robot hand 15.

The support table 10 supports the clamp installation apparatus 1 to extend to the x direction, and is longer than the work 80 to which the clamp is installed.

The first rail 11 is fixed on the support table 10 to extend to the x direction, and is longer than the work 80 to which the clamp is installed, like the support table 10.

The second rail support table 12 is arranged on the first rail 11, and has the structure that can move along the first rail 11. Therefore, the second rail support table 12 can move to the x direction beyond the length of the first rail 11, i.e. the length of the work 80 to which the clamp is installed.

The second rail 13 is fixed on the second rail support table 12 to extend to the y direction which is orthogonal to the first rail 11. The length of the second rail 13 in the y direction is determined based on a width of the work 80 and the number of works 80 arranged in a lateral direction.

Figure 2:
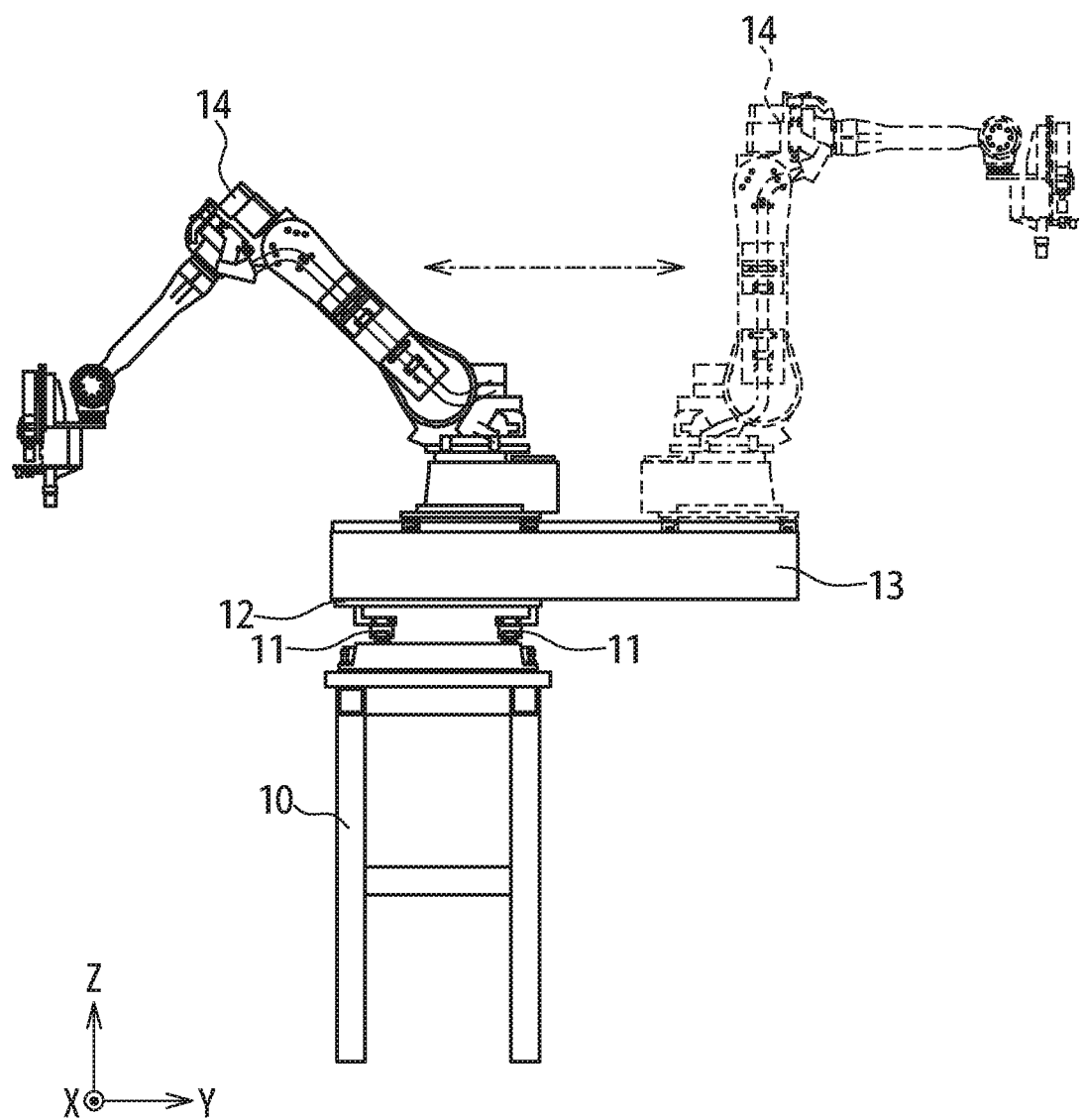
FIG. 2 is a diagram showing a robot arm moving along a second rail of the clamp installation apparatus.

A robot arm pedestal 20 having a rotary table and is arranged on the second rail 13 to support the robot arm 14 rotatably. Therefore, as shown in FIG. 2, the robot arm 14 has the structure to be able to move to the y direction along the second rail 13. Thus, because the second rail 13 has enough length in the y direction even if the works 80 are arranged in the lateral direction, the clamp can be installed to each of the arranged works. Also, because the second rail support table 12 can move to the x direction along the first rail 11, the robot arm, too, can be moved to the x direction in the same way. Thus, the clamp can be installed to the thin work at an optional position.

The robot arm 14 has a first arm 21, a second arm 22, a third arm 23, a fourth arm 24 and a fifth arm 25.

As shown in FIG. 1, the first arm 21 is arranged on the robot arm pedestal 20, and is provided to be rotatable in a direction of an arrow 101 in FIG. 1, i.e. in the x-y plane around a first joint 201 which is a connection section with the robot arm pedestal 20.

As shown in FIG. 1, the second arm 22 has a shape extending in one direction. One end of the second arm 22 is connected with the first arm 21, and the other end thereof is connected with the third arm 23. In the condition of FIG. 1, the second arm 22 is provided to be rotatable in the direction of an arrow 102 in FIG. 1, i.e. in the z-x plane around a second joint 202 which is a connection section with the first arm 21. In other words, when the first arm 21 rotates by 90° to the robot arm pedestal 20 from the state of FIG. 1, the rotation plane of the second arm 22 becomes a y-z plane. Thus, the angle between the extension direction of the second arm 22 and the x-y plane can be optionally adjusted if the extension direction is the upper direction (the +z direction) at least.

The third arm 23 is provided to be rotatable around a third joint 203 which is a connection section with the second arm 22 in the condition of FIG. 1 in the direction of an arrow 103 in FIG. 1, i.e. in the z-x plane.

As shown in FIG. 1, the fourth arm 24 has a shape extending to one direction. One end of the fourth arm 24 is connected with the third arm 23, and the other end thereof is connected with the fifth arm 25. The extension direction of the fourth arm 24 is a direction in the rotation plane of the second arm 22. In other words, the angle between the second arm 22 and the fourth arm 24 changes by rotating the third joint 203 which is the connection section of the third arm 23 and the second arm 22. Also, the fourth arm 24 is provided to be rotatable around a fourth joint 204 which is a connection section with the third arm 23 in the condition of FIG. 1 in the direction of an arrow 104 of FIG. 1, i.e. in the y-z plane.

Figure 3:
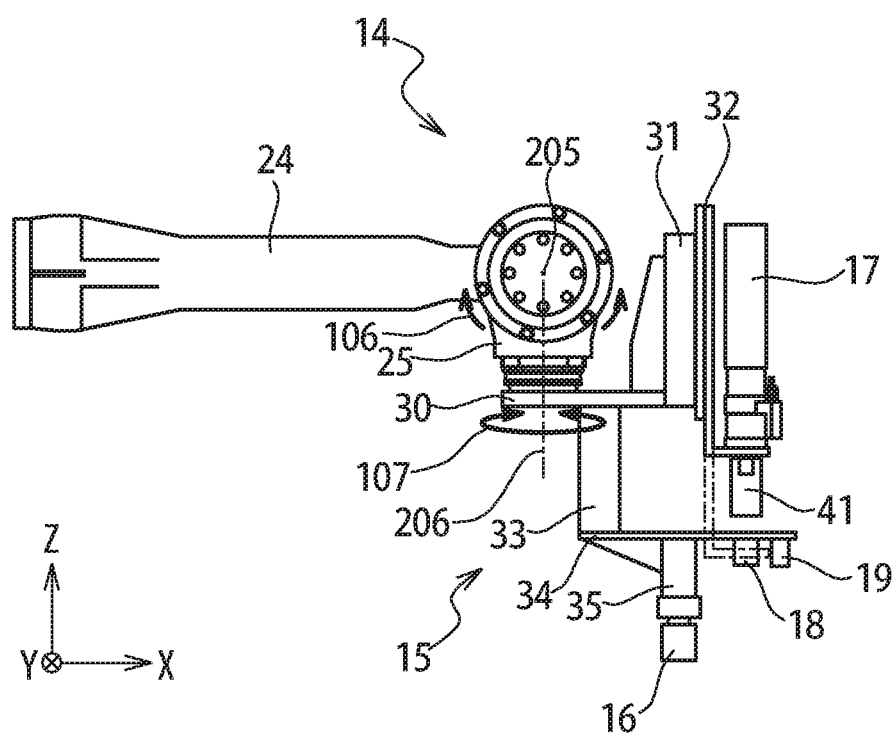
FIG. 3 is a partially expanded view of an A section in FIG. 1.

The fifth arm 25 is provided to be rotatable around a fifth joint 205 which is a connection section with the fourth arm 24 in the condition of FIG. 3 in the direction of an arrow 106 of FIG. 3, i.e. in the z-x plane. In this way, the angle between the fifth arm 25 and the fourth arm 24 changes by rotating the connection section between the fifth arm 25 and the fourth arm 24. Also, the fifth arm 25 becomes rotatable in the x-y plane by rotating the fourth joint 204, which is a connection section between the third arm 23 and the fourth arm 24, by 90° from the state of FIG. 3. In other words, as shown in FIG. 3, a tip section of the fifth arm 25 can move to the −y direction or the +y direction from the state being in the lower side with respect to a fifth joint 205 which is a connection section with the fourth arm 24.

In this way, by controlling the rotation of each joint of the robot arm 14, it is possible to control the position and angle of the tip section of the robot arm 14, i.e. the tip section of the fifth arm 25 to the robot arm pedestal 20. Also, in the condition of FIG. 3, the tip section of the fifth arm 25 is provided to be rotatable to the direction of an arrow 107 of FIG. 3, i.e. in the x-y plane around a sixth joint 206 as a center on the end surface.

As shown in FIG. 3, the robot hand 15 has side plates 30 and 34, vertical plates 31, 33 and 35, a nut runner supporting section 32, a parallel chuck 16, a nut runner 17, a first laser sensor 18 and a second laser sensor 19.

The side plate 30 is formed as a flat plate extending to the x direction. The upper surface of an end section of the side plate 30 in the −x direction is fixed on the tip of the fifth arm 25 of the robot arm 14. In other words, by controlling the rotation of the connection sections between the arms of the robot arm 14, the position and angle of the robot hand 15 to the robot arm pedestal 20 can be controlled. Also, in the condition of FIG. 3, by rotating the tip section of the fifth arm 25 around the sixth joint 206, the side plate 30 can be rotated in the direction of an arrow 107 of FIG. 3, i.e. in the x-y plane.

The vertical plate 31 is formed as a flat plate extending to the z direction. The lower end of the vertical plate 31 is fixed to the end of the side plate 30 in the +x direction to be orthogonal to the side plate 30.

The nut runner supporting section 32 is arranged on the side surface of the vertical plate 31 in the +x direction. The nut runner supporting section 32 has the structure to be slidable to an upper or lower direction with respect to the vertical plate 31.

The nut runner 17 is supported by the nut runner supporting section 32. The nut runner supporting section 32 slides up or down with respect to the vertical plate 31 so that the nut runner 17 moves to the upper or lower direction. Also, a socket 41 of the nut runner 17 is arranged on lower side. The nut runner 17 controls the rotation of the socket 41.

In other words, the nut runner 17 can rotate a bolt when the socket 41 engages with the bolt.

The vertical plate 33 is formed as a flat plate extending to the z direction. The upper end of the vertical plate 33 is fixed to the center of the lower surface of the side plate 30 to be orthogonal to the side plate 30.

The side plate 34 is formed as a flat plate extending in the x direction. The end of the side plate 34 in the −x direction is fixed on the lower end of the vertical plate 33 to be orthogonal to the vertical plate 33.

The vertical plate 35 is formed as a flat plate extending to the z direction. The upper end of the vertical plate 35 is fixed to the center of the lower surface of the side plate 34 to be orthogonal to the side plate 34.

Figure 4:
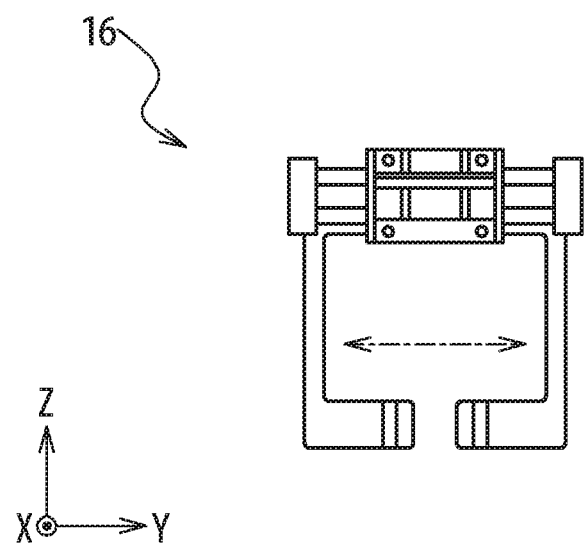
FIG. 4 is a right side view of a parallel chuck shown in FIG. 3.

The parallel chuck 16 is supported by the lower end of the vertical plate 35. As shown in FIG. 4, the parallel chuck 16 opens and closes the lower end of the parallel chuck 16 by expanding or contracting a movable section to the y direction. The parallel chuck 16 holds the clamp between the lower ends.

As shown in FIG. 3, the first laser sensor 18 and the second laser sensor 19 are arranged on the end section of the side plate 34 in the +x direction. In this case, the end section of the side plate 34 in the +x direction is shifted to the −y direction from the position of the nut runner 17, i.e. to the front direction of the drawing, not to contact even if the nut runner 17 moves down. The second laser sensor 19 and the first laser sensor 18 are arranged in this order from the end of the side plate 34 in the +x direction.

Figure 10:
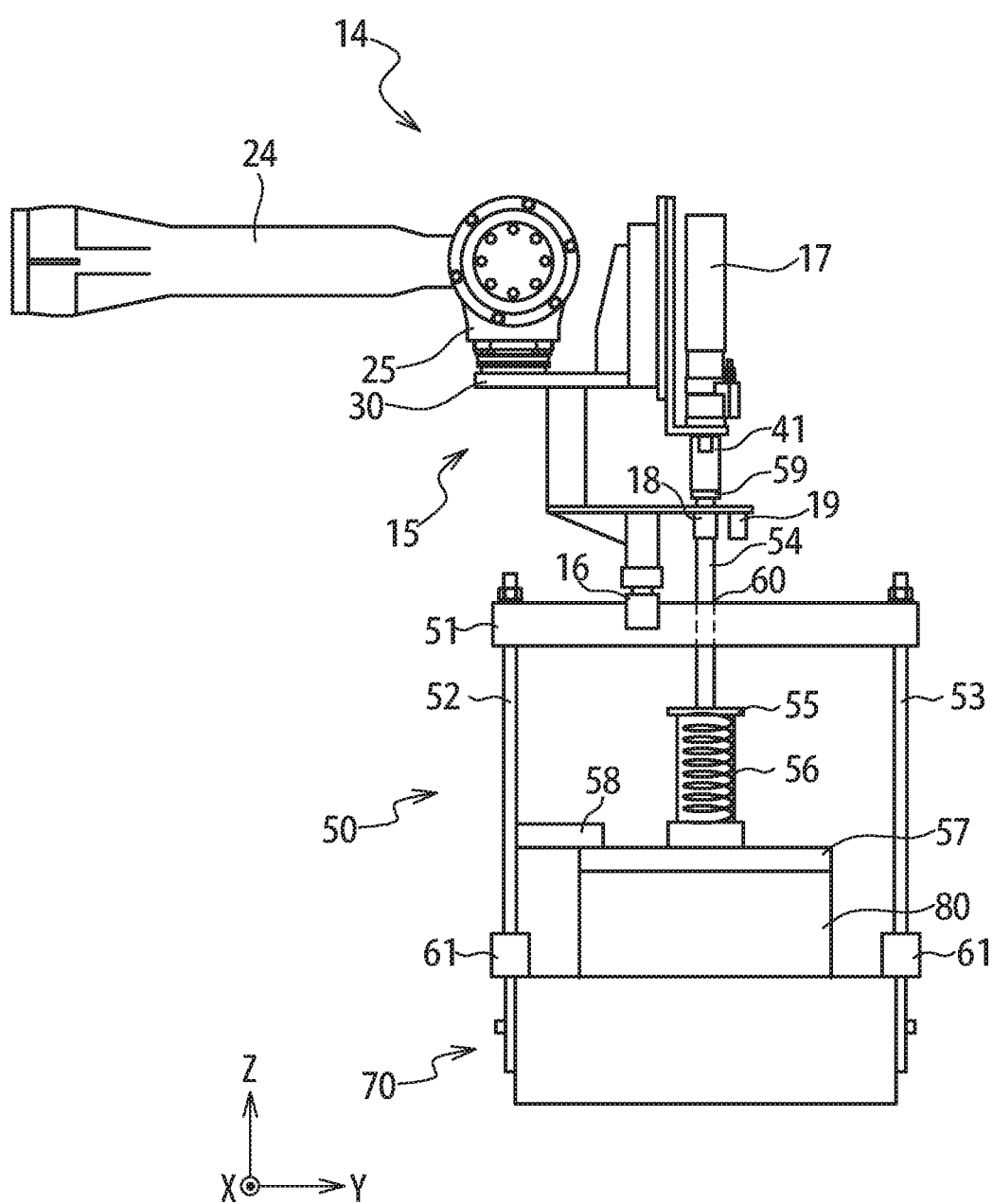
FIG. 10 is a diagram showing a method of installing the clamp to the work by the clamp installation apparatus according to the present invention.

As shown in FIG. 10, the first laser sensor 18 and the second laser sensor 19 are used in case of installing or removing the clamp 50. The first laser sensor 18 measures position data of the spring-section upper plate 55, i.e. a distance to the spring-section upper plate 55. Also, the second laser sensor 19 measures position data of the spring-section lower plate 57, i.e. a distance to the spring-section lower plate 57. The length of the spring 56 is calculated from a difference between the measured values. It is possible to know the clamp force based on the calculated length.

Also, the clamp installation apparatus 1 has a control device 1000. The control device 1000 controls the position of the second rail support table 12 on the first rail 11, the position of the robot arm 14 on the second rail 13, the angle of the connection section of each arm of the robot arm 14, the slide position of the nut runner supporting section 32, the rotation of the nut runner 17 and the opening and closing of the parallel chuck 16.

The control device 1000 has a central processing unit (CPU), a storage unit, and a memory.

An instruction set to the clamp installation apparatus 1 is stored in the storage unit.

The CPU reads instructions of the instruction set to the clamp installation apparatus 1 from the storage unit, and controls the sections of the clamp installation apparatus 1 in response to the read instructions.

The memory is used to store temporary data when the CPU controls the sections of the clamp installation apparatus 1 in response to the instructions read from the storage unit.

(Method of Installing Clamp)

As shown in FIG. 7, a method of installing the clamp 50 to the work 80 placed on the work pedestal 70 by using the clamp installation apparatus 1 will be described.

When the clamp 50 is to be installed, the robot arm 14 lifts up the clamp 50 to move to an installation position, and then installs the clamp 50 to the work 80. These operations are realized by the CPU of control device 1000 reading the instructions to the clamp installation apparatus 1 from the storage unit, and controlling the sections of the clamp installation apparatus 1.

Figure 11:
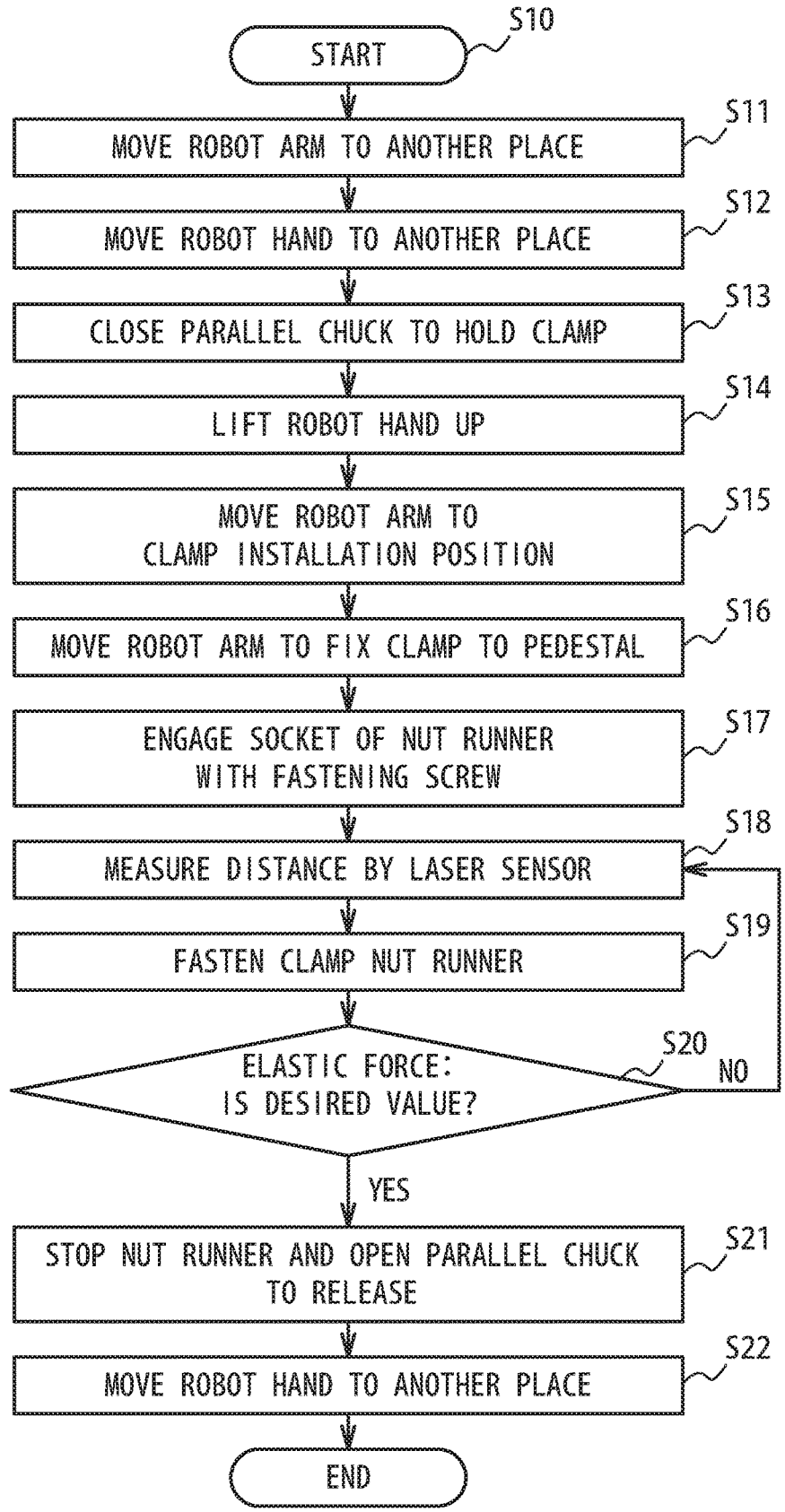
FIG. 11 is a diagram showing a processing flow of the method of installing the clamp by using the clamp installation apparatus.

As shown in FIG. 11, specifically, at a step S11, the control device 1000 controls a position of the second rail support table 12 on the first rail 11 and a position of the robot arm 14 on the second rail 13. Then, the control device 1000 moves the robot arm 14 to a predetermined position of the clamp 50. In this case, the movement distance is previously set in one instruction stored in the storage unit. Next, at a step S12, the control device controls each section of the robot arm 14 to move the robot hand 15 to a position at which the clamp 50 can be held by the parallel chuck 16. Next, at a step S13, the control device controls the parallel chuck 16 to close and hold the clamp 50. Then, the control advances to a step S14, and the control device moves the robot hand 15 up so that the robot hand 15 and the clamp 50 do not interfere with another component even if the control device controls each section of the robot arm 14 and moves the robot arm 14.

At a step S15, the control device controls a position of the second rail support table 12 on the first rail 11 and a position of the robot arm 14 on the second rail 13. Thus, the control device moves the robot arm 14 to the installation position of the clamp 50 to convey the clamp 50.

At a step S16, the control device controls each section of the robot arm 14 to lower the clamp 50 held by the parallel chuck 16 to the installation position from an upper position. Next, the control device controls each section of the robot arm 14 to move the clamp 50 to the −x direction so that the hooks 61 provided at the lower sections of the first arm section 52 and second arm section 53 in the clamp, as shown in FIG. 9 are hooked and coupled with the connection sections 71 on the work pedestal 70.

At a step S17, the control device controls the nut runner supporting section 32 to move down. When the nut runner supporting section 32 does not move even if a force above a predetermined level is applied downwardly, the control device controls to stop the downward movement. In other words, as shown in FIG. 10, the nut runner supporting section 32 is moved so that the socket 41 of the nut runner 17 engages with the head 59 of the fastening screw 54 of the clamp 50.

Next, at a step S18, the control device controls the first laser sensor 18 to measure a distance to the spring-section upper plate 55 of the clamp 50 and the second laser sensor 19 to measure a distance to the spring-section lower plate 57 of the clamp 50. The measured values are transmitted to the control device.

The control device calculates the length of the spring 56, i.e. the distance between the spring-section upper plate 55 and the spring-section lower plate 57 based on the measured values received from the first laser sensor 18 and the second laser sensor 19. For example, when the first laser sensor 18 and the second laser sensor 19 are arranged in the same height, the length of the spring 56 can be calculated by subtracting the measured value of the first laser sensor 18 from the measured value of the second laser sensor 19.

Next, at a step S19, the control device controls the nut runner 17 to rotate the socket 41 so as to rotate the fastening screw 54 of the clamp 50. Thus, the fastening screw 54 is moved down. In other words, the spring-section upper plate 55 of the clamp 50 moves downwardly. In the same way, the spring-section lower plate 57 moves downwardly until contacting the work 80. After the spring-section lower plate 57 touches the work 80, the spring-section lower plate 57 becomes not able to move downwardly. Further, when the fastening screw 54 is rotated to fasten up the engaging section of the side plate section 51 and the fastening screw 54, the spring 56 shrinks as the spring-section upper plate 55 moves downwardly. Thus, the elastic force of the spring 56 increases so that the pushing force through the spring-section lower plate 57 increases.

At a step S20, while the socket 41 of the nut runner 17 is rotated, the first laser sensor 18 and the second laser sensor 19 continue to measure the distances to the spring-section upper plate 55 and the spring-section lower plate 57. In other words, the first laser sensor 18 and the second laser sensor 19 continue to measure the length of the spring 56. The control device calculates a shrinkage length of the spring 56 by comparing the length of the spring 56 before the socket 41 of the nut runner 17 is rotated and the length of the spring 56 at a current time, based on the measured values of the first laser sensor 18 and second laser sensor 18. The elastic force F can be calculated from the equation $F=k \times h$, where the shrinkage length h and a spring constant k. Thus, the control device can calculate the elastic force of the spring 56 at the current time. The control device continues to rotate the socket 41 of the nut runner 17 until the elastic force of the spring 56 becomes a desired value.

When the elastic force of the spring 56 has reached the desired value, the control advances to step S21. In other words, the control device stops the rotation of the nut runner, and moves the nut runner supporting section 32 upwardly so as to open the parallel chuck 16.

Lastly, at a step S22, the control device controls each section of the robot arm 14 to move the robot hand 15 upwardly.

In this way, since the clamp 50 is installed to the work 80, the work 80 is put between the work pedestal 70 and the spring-section lower plate 57 with the elastic force of the spring 56 of the clamp 50. Thus, the clamp is maintained in a holding state. Also, even if the work 80 is shrunken through the heat hardening and so on, the spring-section lower plate 57 moves downwardly by the elastic force of the spring 56. Therefore, the work 80 is put between the work pedestal 70 and the spring-section lower plate 57, and the clamp force maintains the holding state.

(Method of Removing Clamp)

A method of removing the installed clamp 50 by using the clamp installation apparatus 1 will be described.

Figure 12:
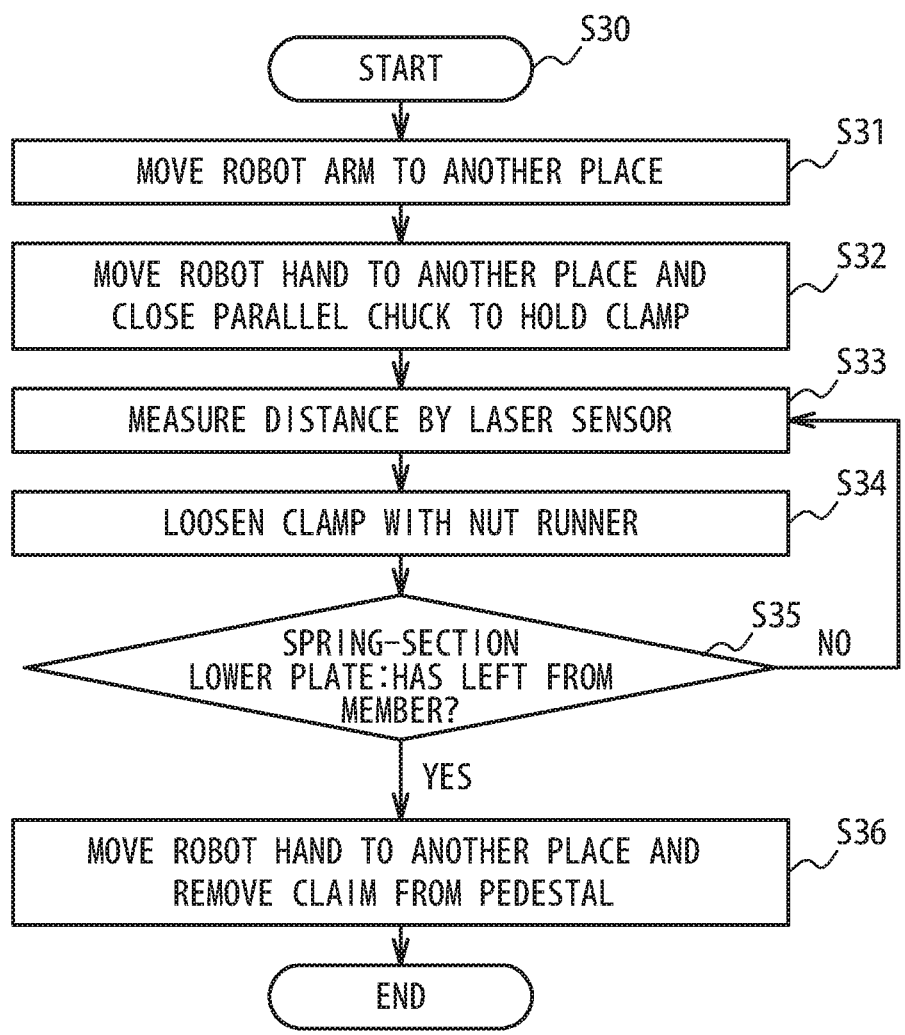
FIG. 12 is a diagram showing a processing flow of removing the clamp by using the clamp installation apparatus.

First, as shown in FIG. 12, at a step S31, the control device controls a position of the second rail support table 12 on the first rail 11 and a position of the robot arm 14 on the second rail 13 and moves the robot arm 14 to the clamp 50 to be removed.

Next, at a step S32, the control device controls each section of the robot arm 14 to move the robot hand 15 to a removal position of the clamp 50. The control device controls the parallel chuck 16 to close so as to hold the clamp 50.

The control advances to a step S33, and the control device moves the nut runner supporting section 32 downwardly for the socket 41 of the nut runner 17 to engage with the head 59 of the fastening screw 54 of the clamp 50. The second laser sensor 19 measures the distance to the spring-section lower plate 57 of the clamp 50 to transmit the measured value to the control device.

At a step S34, the control device controls the nut runner 17 to rotate the socket 41 so as to move the fastening screw 54 of the clamp 50 upwardly. Thus, the spring-section upper plate 55 of the clamp 50 moves upwardly. When the fastening screw 54 continues to move upwardly, the elastic force of the spring 56 becomes weak and the spring-section lower plate 37, too, moves upwardly. In other words, the spring-section lower plate 57 leaves the work 80. In this way, the control device continues to rotate the socket 41 of the nut runner 17 until the spring-section lower plate 57 leaves the work 80.

In order to determine whether or not the spring-section lower plate 57 left, the second laser sensor 19 continues to measure the distance to the spring-section lower plate 57 of the clamp 50. At a step S35, the control device determines that the spring-section lower plate 57 has left the work 80, when the measured value of the second laser sensor 19 becomes smaller by a predetermined value than the measured value before rotating the socket 41 of the nut runner 17.

Lastly, at a step S36, if the spring-section lower plate 57 has left the work 80, the control device controls each section of the robot arm 14 to move the clamp 50 to the x direction so as to remove or unhook the hooks 61 of the first arm section and the second arm section from the connection sections 71 of the work pedestal 70. After that, the control device controls each section of the robot arm 14 to move the clamp 50 upwardly.

In this way, by controlling the clamp installation apparatus 1, the clamp 50 can be removed from the work pedestal 70.

(Method of Manufacturing Stringer for Aircraft)

A method of manufacturing a stringer for an aircraft as a specific work 80 by using the clamp installation apparatus 1 will be described.

First, prepregs are stacked to be shaped to the stringer for the aircraft. Next, the shaped prepregs are covered with a sheet and put on the work pedestal 70. As mentioned above, the control device controls the clamp installation apparatus 1 to install the clamps 50 to desired positions of the work 80. In this case, the elastic force of the spring 56 of each clamp 50 is controlled to be a desired value.

The work 80 with the clamps 50 installed is set in an autoclave together with the work pedestal 70 and is subjected to high-temperature processing to cure the prepregs.

After that, the work pedestal 70 is taken out from the autoclave and the control device controls the clamp installation apparatus 1 to remove each clamp 50.

Lastly, by removing the sheet, the stringer for the aircraft can be manufactured.

(Effect)

As mentioned above, according to the present invention, the clamp can be automatically installed and removed. Also, thermally curing can be carried out in the state that the clamp has been installed. Also, since the elastic force can be measured by using the distance from the spring-section upper plate to the spring-section lower plate, the clamping force to the work can be measured irrespective of the plate thickness (in the z direction) of the work.

Also, an example in which the laser sensor is used as the measuring section has been shown. However, the measuring section may be provided in the nut runner and a torque value in the nut runner may be measured to adjust the elastic force of the spring. In this case, in order to reduce the lodged state of the engaging section between the fastening screw and the side plate section, it will be necessary to use lubricating oil and so.

At this time, in case of manufacturing the stringer, the inside of the autoclave must be heated to a temperature equal to or more than 100° C. to cure the prepregs. Therefore, if the oil and so on is used for the clamp to be installed to the work, there is a possibility that the deterioration of quality of the product occurs due to oil leakage in the autoclave. Therefore, it is desirable not to use the oil such as lubricating oil for the clamp.

In other words, the deterioration of quality of the product can be prevented by using the above-mentioned clamp installation apparatus 1 and the clamp 50, and by measuring the elastic force of the spring by the laser sensor.

Also, instead of applying the clamp force to the work by using the spring of the clamp, it will be possible to apply the clamp force by placing a heavy load on the work. In case of manufacturing the above-mentioned stringer for aircraft, the clamp force equal to or more than 200 kg is required. For this reason, to heat the work in the condition for the clamp force to be applied, it is necessary to put the whole work including the heavy load in the autoclave. In this case, the temperature in the autoclave is raised to heat the work. In this situation, the temperature of the heavy load, too, rises. In other words, to set the inside of the autoclave at a high temperature, the heavy load, too, must be made hot. Therefore, a long time is necessary to raise the temperature of the heavy load and the long time for the curing is required. On the other hand, since the above-mentioned clamp 50 has smaller thermal capacity than the heavy load, the temperature rises in a short time. In other words, by using the above-mentioned clamp installation apparatus 1 and the clamp 50, the time for the heat curing can be made short.

Also, an example in which the spring is used to apply the clamp force on the work has been described. However, the clamp force may be applied directly by the fastening screw without using the spring. In this case, to measure the force applied to the work, a method of measuring a torque value of the nut runner is thought of. However, when the work shrinks during the heat curing, a space is generated between the fastening screw and the work so that the clamp force cannot be applied to the work. In other words, the method can be adopted when the work does not shrink during the heat curing. For example, in case of manufacturing the above-mentioned stringer, since the sheet which covers the work during the heat curing shrinks, this configuration cannot be adopted. In other words, even if there is a step of shrinking the work, it is possible to continue to apply the clamp force on the work by arranging the spring in the clamp.

MODIFICATION EXAMPLE

As the measuring section, an example of two laser sensors has been described. However, if the clamp can measure the force which presses the work, various examples may be used. For example, one laser sensor may be used to measure the distance between the spring-section upper plate and the spring-section lower plate. Specifically, the distances to the spring-section upper plate and the spring-section lower plate may be measured at a same time by using a laser sensor which can be measured by using two kinds of laser different in frequency. Moreover, when the position of the spring-section lower plate is previously determined due to the thickness of the work, only the distance from the laser sensor to the spring-section upper plate may be measured and the shrinkage length of the spring may be calculated based on the measured distance.

Also, when the position of the spring-section lower plate is previously determined due to the thickness of the work, the number of times of rotation of the fastening screw by the nut runner may be measured. The distance by which the spring-section upper plate moves downwardly is determined by the number of times of the rotation of the fastening screw. Therefore, the shrinkage length of the spring may be calculated by measuring the number of rotations.

Also, in case of other examples of the measuring section, a hard plate of a desired thickness may be arranged on the spring-section lower plate so that the distance between the spring-section upper plate and the spring-section lower plate does not shrink more than a desired length. In this case, the torque value of the nut runner may be measured, and the rotation of the socket may be stopped when the torque value is more than a predetermined value. In this configuration, even if the fastening screw cannot rotate smoothly, a desired elastic force can be given to the spring by making the torque value as a threshold value sufficiently large. In other words, it is not necessary to use lubricating oil between the fastening screw and the side plate section.

The arranging position of the measuring section is not limited to the side plate of the robot hand, and it is possible to arrange in an optional position according to the shape and structure of the clamp.

As the fastening section, an example of the nut runner has been described. However, the fastening section is enough to be able to control the clamp force of the clamp, and is possible to have an optional shape and structure according to the shape of the clamp. Also, the arranging position of the fastening screw is not limited to a position above the supporting section. According to the shape of the clamp, it is possible to arrange in an optional position.

As the clamp holding section, an example of the parallel chuck has been described but the present invention is not limited to this. If the clamp can be held, it is possible to select optionally from among a collet chuck, a vacuum chuck and a magnet chuck according to the shape of the clamp.

The robot hand which has the side plates 30 and 34, the vertical plates 31, 33 and 35 and the nut runner supporting section 32 has been described as an example. However, the present invention is not limited to this. if the measuring section is arranged in a desired position and the robot hand is arranged to be movable according to the shapes of the fastening screw and the clamp holding section, an optional configuration can be selected for the robot hand.

An example of the robot arm having five arms has been described. However, an optional robot arm can be selected according to the shape and position of the clamp to be installed.

As the moving mechanism of the robot arm, an example which uses the first rail and the second rail which are fixed on the support table has been described. However, it is enough that the position of the robot arm can be controlled, and the present invention is not limited to this. An optional configuration can be selected such as a configuration having wheels and legs and a self-propelled configuration on a previously specified route.

An example has been described in which a movement distance by the moving mechanism is previously set to an instruction which is stored in the storage unit. However, the present invention is not limited to this. The movement distance on the first rail and the second rail may be determined by using a sensor which measures a direction of and a distance to the installation position of the clamp. In this case, it is desirable to install the sensor to the robot arm.

An example has been described in which the elastic section of the clamp is configured of the spring, the spring-section upper plate and the spring-section lower plate. However, the elastic section is enough if having the elastic force, and it is possible to select optionally according to a process after installing the clamp. For example, rubber or a hydraulic pressure cylinder may be used.

Figure 13:
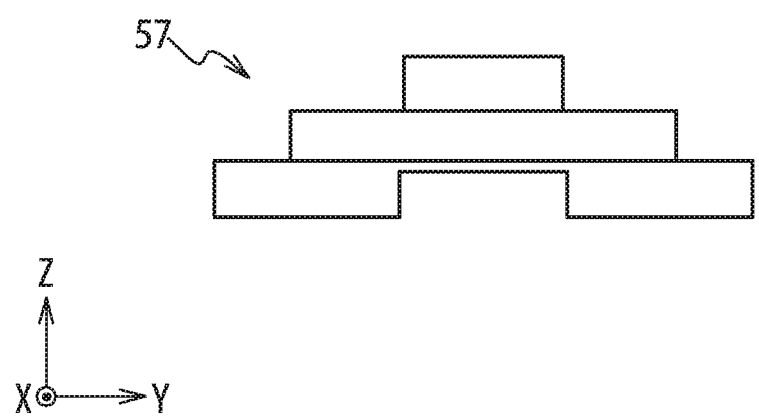
FIG. 13 is a diagram showing a modification of a spring-section lower plate.

An example has been described in which the spring-section lower plate has a flat plate shape. However, the spring-section lower plate is enough if it is possible to press the work, and an optional shape can be selected. For example, as shown in FIG. 13, the underside of the spring-section lower plate may be formed to have a concave shape according to the shape of the work.

Also, an example has been described in which the spring-section lower plate is connected with the spring. However, the spring-section lower plate is enough if the elastic force of the spring is transferred to the work through the spring-section lower plate, and the present invention is not limited to this. For example, the spring and the spring-section lower plate may be connected through a rotatable member in a contact plane between them.

An example has been described which has two arm sections of the first arm section and the second arm section. However, a structure having only one of the arm sections may be used.

An example has been described in which the upper ends of the arm sections are connected with the both ends of the side plate section. However, it is enough that the elastic force of the spring applied with force by the rotation of the fastening screw functions as a force of pressing the work. A connection position between the arm section and the side plate section can be optionally selected. Also, an angle between the side plate section and the arm section can be optionally selected.

Also, an example has been described in which the connection section of the lower end of the arm section is formed like a hook. However, the present invention is not limited to this. The connection section of the lower end of the arm section may be L-character shape to hold the lower section of the work pedestal.

An example has been described in which the frame of the clamp is configured from the side plate section of the flat plate shape and the arm section. However, the present invention is not limited to this. The side plate section as a part of the frame is connected with the first arm section and the second arm section, and it is enough that the spring-section upper plate can be pushed by rotating the fastening screw. An optional shape such as a column can be selected.

An example has been described in which the fastening screw is used as the screw section of the clamp, and the fastening screw is engaged with the center of the side plate section in the x direction. However, it is enough that a force is applied to the elastic section through the rotation of the fastening screw, and the fastening screw may be provided at an optional position. Also, an example has been described in which the head of the fastening screw is hexagonal. However, it is enough that the head of the fastening screw is engaged with the socket of the nut runner, and can be selected to have an optional shape.

An example has been described in which the spring-section lower plate is connected with the first arm section through a connection plate. However, the present invention is not limited to this. It is enough that the rotation of the spring-section lower plate can be prevented, and the spring-section lower plate may be connected with the second arm section, or may he connected with both of the first arm section and the second arm section. Also, the connection plate may have an optional shape. Moreover, the spring-section lower plate may be directly connected with the first arm section or the second arm section.

An example has been described in which the clamp 50 is used as a clamp of the clamp installation apparatus. However, the present invention is not limited to this. For example, the clamp such as a C-type clamp and an F-type clamp may be used. In this case, the arrangement of the clamp holding section, the fastening section, and the measuring section in the supporting section of the clamp installation apparatus is determined according to the shape of the clamp.

An example has been described in which the robot arm is arranged on the support table. However, the robot arm may be installed on a rail hung from the ceiling. Also, an example has been described in which the work is clamped in the upper or lower direction by the clamp and the work pedestal. However, the present invention is not limited to this. For example, the clamp is installed in a horizontal direction and the work may be clamped in the horizontal direction by the side surface and the clamp.

An example has been described in which the control device 1000 of the clamp installation apparatus is used as the control device. However, the present invention is not limited to this. The control device may be provided outside the clamp installation apparatus, and parts of the control device may be provided in a plurality of locations such as the clamp installation apparatus and other locations according to the control. Also, a communication device may be provided for each of the clamp installation apparatus and the distributed control device parts, and a control signal may be transmitted and received by using a wire communication or a wireless communication.

An example has been described in which the work pedestal has a connection section in either side end. However, the present invention is not limited to this. The connection section may be provided for the central part in addition to either side end, so as to make it possible to heat-cure a plurality of works at a same time. Also, wheels may be provided so that the work pedestal can be easily carried to the autoclave. Moreover, the plurality of work pedestals may be arranged.

Also, an example has been described in which the connection section of the work pedestal has the shape of a columnar prominence. However, the present invention is not limited to this. The connection section may have an optional shape according to the connection section of the clamp.

As above, the present invention has been described with reference to the embodiments. However, the present invention is not to be limited to the above embodiments. A skilled person could apply various changes or modifications to the configuration of the present invention appropriately in the range of the technical thought of the present invention.

This application is based on Japanese Patent Application No. 2016-219185 which was filed on Nov. 9, 2016, and claims a priority based on the Japanese Patent Application. The disclosure thereof is incorporated herein by reference.

The invention claimed is:
1. A clamp installation apparatus comprising:
a robot arm pedestal having a rotary table;
a robot arm installed on the rotary table of the robot arm pedestal and having a plurality of arms and a plurality of joints;
a robot hand installed to the most distal arm of the plurality of arms; and
a control device, wherein the robot hand comprises:

a clamp holding section configured to hold a clamp;

a fastening section configured to fasten an engaging section of the clamp to give a clamp force to a work; and a measuring section configured to collect position data of a predetermined member of the clamp, wherein the control device:

controls the clamp holding section to hold the clamp;

controls the rotary table, the plurality of joints of the robot arm and the robot hand such that the clamp is conveyed to a first predetermined position of a work pedestal on which the work has been placed in a condition that the clamp is held, and that an engaging section of the clamp is coupled to an connection section of the work pedestal; and controls the fastening section so that the clamp force is calculated based on the position data acquired from the measuring section in a condition that the clamp and the work pedestal are connected to each other, and the calculated clamp force become a predetermined value.

2. The clamp installation apparatus according to claim 1, wherein the clamp comprises:

a frame;

a screw section configured to engage with the frame and extend;

an elastic section connected with the screw section and configured to give the clamp force to the work, wherein the control device controls the fastening section to screw the screw section, so that the calculated clamp force becomes the predetermined value in a condition that the clamp and the work pedestal are coupled to each other.

3. The clamp installation apparatus according to claim 2, wherein the elastic section comprises:

a spring;

a spring-section upper plate provided to one end of the spring to be connected with the screw section; and a spring-section lower plate provided to the other end of the spring, and wherein the spring-section lower plate gives an elastic clamp force to the work.

4. The clamp installation apparatus according to claim 3, wherein the measuring section has a laser sensor section configured to measure the position data of the spring-section upper plate and the spring-section lower plate.

5. The clamp installation apparatus according to claim 2, wherein a head is formed in an upper end of the screw section, and wherein the fastening section has a nut runner configured to drive the head.

6. The clamp installation apparatus according to claim 1, wherein the clamp holding section has a parallel chuck which holds the clamp.

7. The clamp installation apparatus according to claim 1, wherein the work pedestal has a plurality of prominences, and wherein the clamp has a frame and plurality of hooks installed to the frame and engaged with the plurality of prominences, respectively.

8. A clamp installation system comprising:

the clamp installation apparatus according to claim 1;

a first rail extending to a first direction as a longitudinal direction of the work; and a second rail extending to a second direction orthogonal to the first direction, wherein the robot arm pedestal comprises:

a first traveling mechanism configured to run on the first rail; and a second traveling mechanism configured to run on the second rail, and wherein the control device drives the first traveling mechanism and the second traveling mechanism so that the robot arm pedestal is moved to a predetermined position.

9. A method of installing a clamp in a clamp installation system which comprises:

a robot arm pedestal having a rotary table;

a robot arm installed on the rotary table of the robot arm pedestal and having a plurality of arms and a plurality of joints; and a robot hand installed in a forefront arm of a plurality of arms, wherein the robot hand comprises:

a clamp holding section configured to hold a clamp;

a fastening section configured to fasten an engaging section of the clamp to give the clamp force to a work;

a measuring section configured to collect position data of a predetermined member of the clamp;

the method of installing a clamp comprising:

driving the rotary table and the plurality of joints to move the robot hand above the clamp as a first clamp;

lowering the robot hand to hold the first clamp by the clamp holding section;

lifting the first clamp in a condition that the first clamp is held;

conveying the first clamp to a first predetermined position of a work pedestal on which the work is put;

lowering the robot hand and moving the robot hand in a horizontal plane so that an engaging section of the first clamp is engaged with a connection section of the work pedestal;

calculating the clamp force based on the position data acquired from the measuring section in a condition that the first clamp and the work pedestal are coupled to each other; and driving the fastening section so that the calculated clamp force becomes a second predetermined value.

10. The method of installing the clamp according to claim 9, wherein the clamp installation system further comprises:

a first rail extending to a first direction as a longitudinal direction of the work; and a second rail extending to a second direction orthogonal to the first direction, wherein the robot arm pedestal comprises:

a first traveling mechanism configured to run on the first rail; and a second traveling mechanism configured to run on the second rail, wherein the conveying the first clamp to the first predetermined position of the work pedestal comprises driving the second traveling mechanism, The method of installing the clamp further comprises:

controlling the clamp holding section to release the first clamp when the installation of the first clamp is ended;

driving the second traveling mechanism to move the robot arm pedestal to a position before taking-out of the first clamp; and driving the first traveling mechanism to move the robot arm to a taking-out position of a second clamp.

* * * * *